Jan. 29, 1935. H. R. TEAR 1,989,160
LUBRICATING DEVICE
Filed Oct. 15, 1932  2 Sheets-Sheet 1

INVENTOR.
HARRY R. TEAR
BY John A. Watson
ATTORNEY.

Jan. 29, 1935.  H. R. TEAR  1,989,160
LUBRICATING DEVICE
Filed Oct. 15, 1932  2 Sheets-Sheet 2

INVENTOR.
HARRY R. TEAR
BY John A. Watson
ATTORNEY

Patented Jan. 29, 1935

1,989,160

UNITED STATES PATENT OFFICE 1,989,160

LUBRICATING DEVICE

Harry R. Tear, South Bend, Ind., assignor to The Lubrication Corporation, South Bend, Ind., a corporation of Delaware Application October 15, 1932, Serial No. 637,920

6 Claims. (Cl. 285—161)

This invention relates to improvements in lubricating devices and more particularly to lubricant discharge nozzles of the type for use in servicing lubricant receiving nipples or fittings.

An object of the invention is to provide a lubricant discharge nozzle affording a metal to metal contact seal between the nozzle and a lubricant receiving fitting, and, in addition, a pliant sealing member acting under the influence of lubricant pressure or subjected to mechanical compression to provide a further seal between nozzle and fitting.

Another object is to provide a lubricant discharge nozzle operable to service a lubricant receiving fitting over a wide angular range of movement in at least one plane.

A further object is to provide a lubricant discharge nozzle wherein the pliant and compressible sealing member is confined against lateral expansion and protected against excessive compression, thus preventing the distortion thereof under extreme pressure such as might destroy its sealing characteristics.

A still further object is to provide a lubricant discharge nozzle wherein an adequate lubricant tight seal may be established during the servicing operation regardless of irregularities in or mutilation of the surface of the fitting head.

Other objects, the advantages and uses of the invention, will be or should become apparent after reading the following description and claims and after consideration of the accompanying drawings forming a part of this specification, in which:

In general, the lubricant discharge nozzles selected for illustration herein comprise, a body A having a lubricant passage B therethrough, one end of which is enlarged and internally threaded as shown at C for connecting the nozzle to a source of lubricant supply, a discharge orifice D formed at the outer end of the passage B, a pliant annular sealing member E located forwardly of the discharge orifice D and a rigid member F formed with an annular sealing surface G located forwardly of the pliant sealing member E fashioned to conform in contour to the surface of the head H of a lubricant receiving fitting J.

All of the nozzles shown herein have been designed for servicing a fitting J of which the head H is spherical in shape although it will be apparent that the nozzle may be constructed to service fittings of various other shapes without departing from the spirit and scope of the invention.

Figure 1:
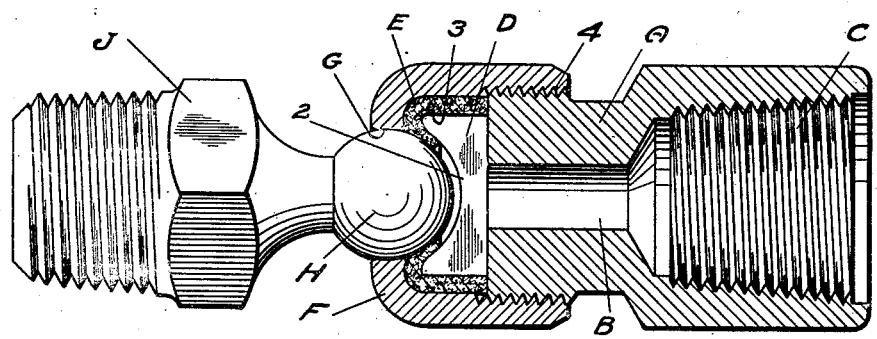
Fig. 1 is a sectional view of a lubricant discharge nozzle constructed according to the invention applied to a lubricant receiving fitting.
Figures 2, 3, 4:
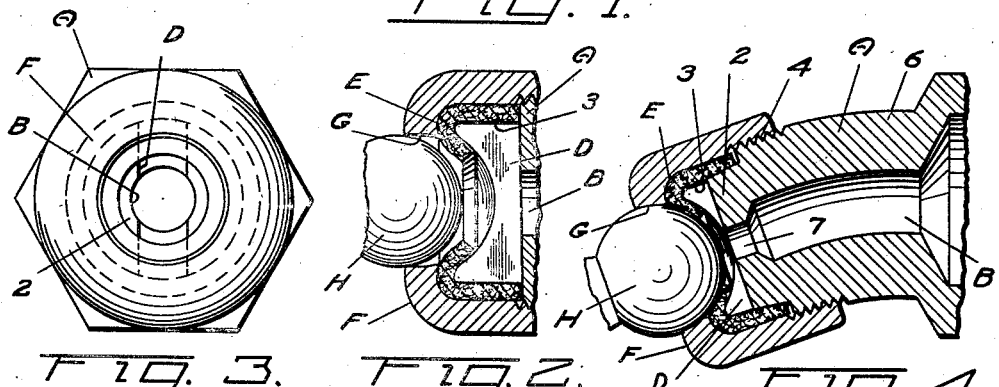
Fig. 2 is a fragmentary sectional view of the nozzle of Fig. 1 disengaged from the fitting.
Fig. 3 is a front elevation of the nozzle of Fig. 1.
Fig. 4 is a fragmentary sectional view of another form of the nozzle applied to a fitting.

With particular reference to Figs. 1 to 3 inclusive, the discharge orifice D comprises a slot formed diametrically across the reduced and outer end 2 of the body A as indicated in Fig. 3. The outer face of the reduced portion 2 of the body is spherically concave, the surface thereof being generated upon a radius equal to the radius of the head H of the fitting plus substantially the thickness of the sealing member E. The pliant sealing member E, preferably formed of rawhide, has a skirt portion 3, which encompasses the side wall of the reduced body portion 2, and a fitting engaging portion extending inwardly toward the axis of the nozzle and against the concave forward end of the body portion 2. The rigid member F in the nozzle of Figs. 1 to 3 as well as those shown in Figs. 4 to 9 inclusive, comprises a metal bushing secured to the body A by screw threads 4 and formed with the annular sealing surface G concentric with the axis of the nozzle. The surface G is spherically concave and arranged to engage with and conform to the spherical surface of the fitting head H so that a metal to metal lubricant tight seal may be established therebetween upon the application of thrust to the nozzle in the direction of the fitting.

In operation, the nozzle may be mounted directly upon a lubricant gun and communication as well as mechanical support established through the medium of the internally threaded portion C of the passage B, or, if desired the nozzle may be connected to a lubricant hose forming the discharge line of a lubricant feeding pump such as is commonly employed in lubricant service stations. With the nozzle thus connected to a source of lubricant supply the operator may apply the nozzle to the fitting J thereby causing engagement of the rigid sealing surface G with the spherical head H of the fitting. This simple operation serves normally to establish a lubricant tight annular seal between the fitting and nozzle. If, however, through abuse or wear, the head H of the fitting should be found to be mutilated or otherwise rendered irregular in surface contour the seal between the surface G and fitting head might be sufficiently impaired as to permit leakage. Under this condition, the pliant sealing member E would suffice to provide an adequate seal between the nozzle and fitting head due to the capability of the sealing member E to adjust itself to the irregular or scarred surface of the head H.

Regardless of whether the fitting head is normal or multilated the pliant sealing member E will function to provide a lubricant tight seal between the fitting and the nozzle independently of the functioning of the surface G. In the nozzles of Figs. 1 to 9 inclusive, the sealing member E, as may be seen, overlies a portion of the discharge orifice D so that lubricant under pressure is subjected to the rear face of the member to induce it to lie close to the surface of the fitting head. Further sealing function of the pliant member E is brought about as a result of the mechanical compression of the member between the surface of the fitting head and particularly the outer portion of the face of the body portion 2 under thrust applied to the nozzle in the direction of the fitting by the operator as previously described.

The elongated discharge orifice D provides for a relatively wide angular range of movement between the fitting and nozzle in that plane including the slot of which the orifice D is formed without destroying lubricant communication between the nozzle and the fitting.

Figures 5, 6, 7:
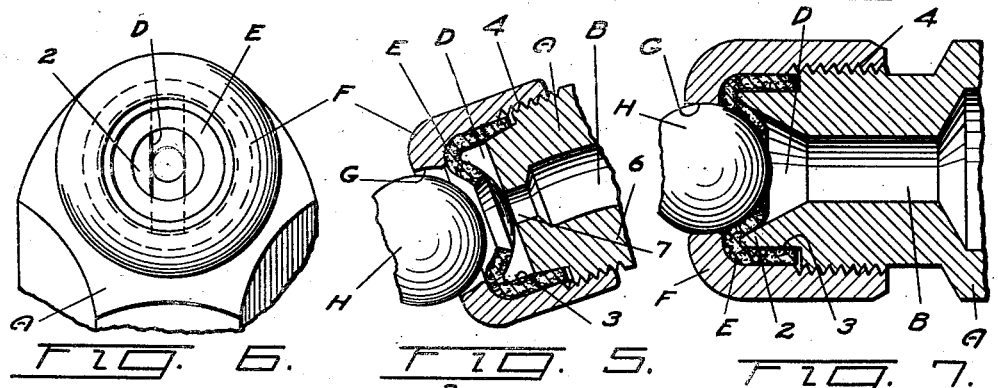
Fig. 5 is a view similar to Fig. 2 of the nozzle of Fig. 4.
Fig. 6 is a front elevation of the nozzle of Fig. 4.
Fig. 7 is a view similar to Fig. 4 of a further form of the nozzle.

The nozzle of Figs. 4 to 6 inclusive, differs from that form shown in Fig. 1 only in that the body A is formed with its mid-portion or neck 6 curved in that plane including the elongated discharge orifice D so that the operator may more readily approach the fitting, particularly where the fitting is located in a position of difficult accessibility. A further but minor difference in structure is provided by a constriction 7 in the passage B adjacent to the discharge orifice D whereby, due to the combined action of capillary attraction and atmospheric pressure, oozing or drooling of the lubricant from the nozzle, when not in contact with a fitting, is substantially eliminated. In all other respects the function of the nozzle is precisely that described in connection with the nozzles of Figs. 1 to 3.

Figures 8, 9:
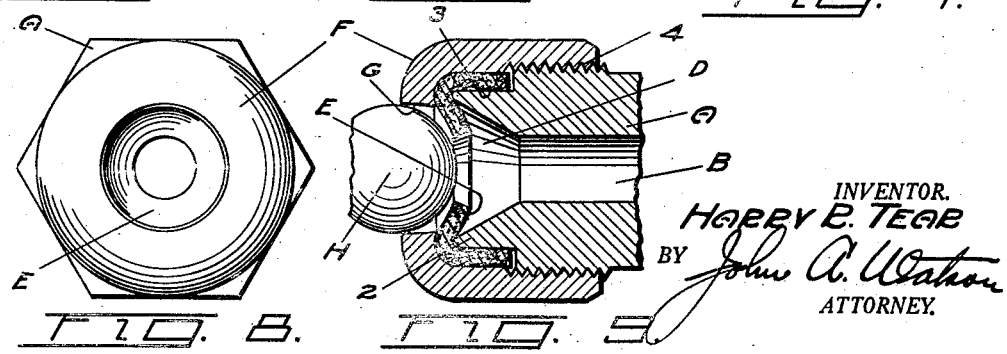
Fig. 8 is a front elevation of the nozzle of Fig. 7.
Fig. 9 is a view similar to Fig. 2 of the nozzle of Fig. 7.

Another form of the nozzle is illustrated in Figs. 7 to 9 inclusive, wherein the discharge orifice D has diverging side walls thereby to present a wide circular mouth partially covered by the pliant sealing member E. In this form of the nozzle it is obvious that a relatively wide range of angular movement between the nozzle and fitting may be carried out in any plane including the axis of nozzle and that the principal advantages and features of the nozzles of Figs. 1 to 6 are also present therein. Attention is called to the ease of assembly of the nozzle and of replacement of the pliant sealing member E, a feature attributable to the interrelationship between the sealing member E and the reduced end portion 2 of the body A and the removable bushing F upon which the annular sealing surface G is formed.

Figure 10:
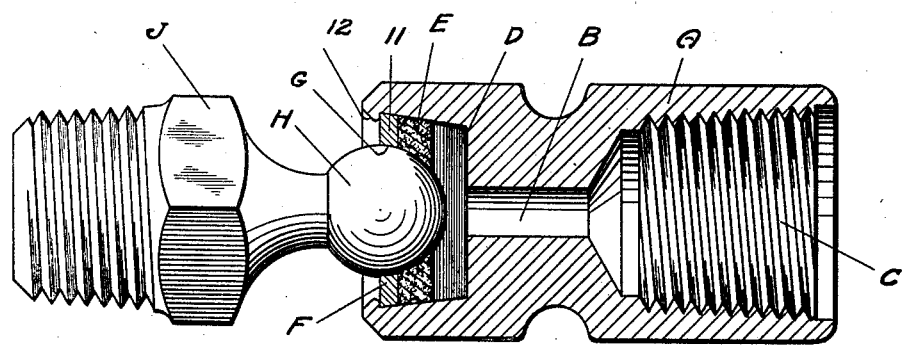
Fig. 10 is a view similar to Fig. 1 of another embodiment of the nozzle.
Figures 11, 12:
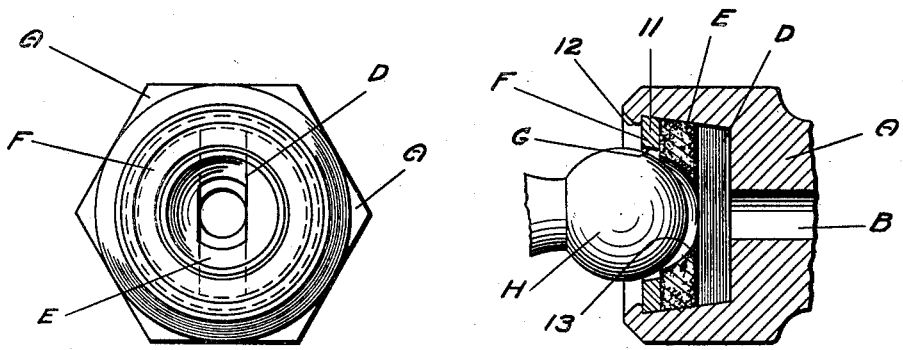
Fig. 11 is a view similar to Fig. 2 of the nozzle of Fig. 10.
Fig. 12 is a front elevation of the nozzle of Fig. 10.

In Figs. 10 to 12, a further form of the nozzle is shown having the feature of low manufacturing cost. In this form of the nozzle the elongated discharge orifice D is formed by diametrically slotting the rearward half of the sealing member E. It is suggested that the member E for this purpose be made of oak tanned leather or any slightly pliant composition so that it may preserve its body, yet yield slightly under sealing pressure. The rigid member F may be constructed in the form of a disc 11 having a central contact surface G. The disc 11 may be held in place forwardly of the sealing member E by swaging a portion 12 of the body A over the periphery of the disc. The forward side or face of the sealing member E has a preformed spherical pocket 13 formed therein adapted to conform by expansion with the outer surface of the head H of the fitting, (see Figs. 11 and 10 respectively). In operation, the nozzle of Figs. 10 to 12 inclusive provides dual sealing function, first, that caused by contact between the sealing member E and the fitting head under both compression due to mechanical thrust and action of lubricant pressure tending to urge the sealing member toward the fitting, and second, that afford by the surface G. It will be observed that the surface G performs a double function; first, it limits the approach of the nozzle toward the fitting, thus protecting the soft sealing member E from excessive compression, and second, it provides metal to metal sealing means. The angular range of the nozzle over the fitting is relatively wide in that plane including the discharge orifice B.

Figure 13:
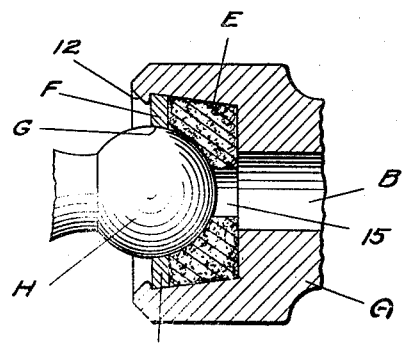
Fig. 13 is a view similar to Fig. 4 of a further modification of the nozzle.
Figure 14:
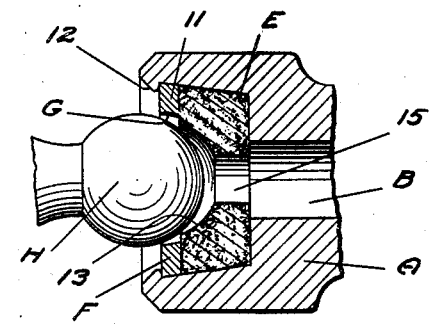
Fig. 14 is a view similar to Fig. 5 of the nozzle of Fig. 13.

The nozzle of Figs. 13 and 14 is identical to that of Figs. 10 to 12 inclusive with the exception that the slot forming the discharge orifice in the sealing member E is omitted and a circular passage 15 is substituted therefor. Except for a wide angular range of the nozzle during the servicing operation, the nozzle performs precisely as that of Fig. 10 though the fluid action on the sealing member tending to urge it against the fitting is reduced.

It is to be understood that the described embodiments of the invention herein set forth are presented for the purpose of illustration only and various changes may be made therein without departing from the spirit of the invention or scope of the appended claims.

I claim:

1. A lubricant discharge nozzle for servicing a spherical headed fitting comprising, a body member having a lubricant passageway therethrough, one end of said passageway being adapted for connection to a source of lubricant supply, means providing a lubricant tight chamber at the other end of said passageway having an aperture through one wall thereof for partially admitting said spherical fitting head within the chamber, a soft annular sealing member within said chamber presenting an annular spherically concave pocket on one face in registration with said aperture for sealing engagement with that portion of said fitting admitted to said chamber, and means including the inner wall of said chamber providing a rigid abutment for the inner face of said sealing member, the side walls of said chamber aperture being fashioned to conform to the surface of said fitting head to form an independent lubricant tight seal therewith.

2. A lubricant discharge nozzle for servicing a spherical headed fitting comprising, a body member having a lubricant passageway therethrough, one end of said passageway being adapted for connection to a source of lubricant supply, means providing a lubricant tight chamber at the other end of said passageway having an aperture through one wall thereof for partially admitting said spherical fitting head within the chamber, and a soft annular sealing member within said chamber presenting an annular spherically concave pocket on one face in registration with said aperture for sealing engagement with that portion of said fitting admitted to said chamber, said soft sealing member being formed with a slot extending diametrically across its rearward portion to intersect a portion of said pocket whereby the angular range of the nozzle over the fitting is increased in that plane including the slot.

3. A lubricant discharge nozzle for servicing a spherical headed fitting comprising, a body member having a lubricant passageway therethrough, one end of said passageway being adapted for connection to a source of lubricant supply, means providing a lubricant tight chamber at the other end of said passageway having an aperture through one wall thereof for partially admitting said spherical fitting head within the chamber, and a soft annular sealing member within said chamber having its inner face bearing upon an inner wall of the chamber and presenting an annular spherically concave pocket on its outer face in registration with said aperture for sealing engagement with that portion of said fitting admitted to said chamber, the side walls of said chamber aperture being fashioned to conform to the surface of said fitting head to form a rigid abutment therefor, said soft sealing member being formed with a slot extending diametrically across its rearward portion to intersect a portion of said pocket whereby the angular range of the nozzle over the fitting is increased in that plane including the slot.

4. A lubricant discharge nozzle for servicing a lubricant receiving fitting having a nozzle engaging head comprising, a body member having a lubricant passageway therethrough, one end of said passageway being adapted for communication with a source of lubricant supply, means providing a lubricant tight chamber at the other end of said passageway having an aperture through one wall thereof for partially admitting said fitting head within the chamber, and a soft annular sealing member within said chamber presenting a surface conforming in contour to that surface of the fitting head admitted to said chamber, said surface being in registration with said aperture for sealing engagement with the said surface of said fitting head when admitted to said chamber and means including the inner wall of said chamber providing a rigid abutment for the inner face of said sealing member, the side walls of said chamber aperture being fashioned to conform to the said surface of said fitting head to form an independent lubricant tight seal therewith.

5. A lubricant discharge nozzle for servicing a spherical headed fitting comprising, a body member having a lubricant passageway therethrough, one end of said passageway being adapted for connection to a source of lubricant supply, means providing a lubricant tight chamber at the other end of said passageway having an aperture through one wall thereof for partially admitting said spherical fitting head within the chamber, a soft annular sealing member within said chamber presenting an annular spherically concave pocket on one face in registration with said aperture for sealing engagement with that portion of said fitting admitted to said chamber, and means said fitting admitted to said chamber, and means including the inner wall of said chamber providing a rigid abutment for the inner face of said sealing member, said abutment having an elongated slotted portion extending thereacross in a plane perpendicular to the axis of the chamber and communicating with said lubricant passageway, the side walls of said chamber aperture being fashioned to conform to the surface of said fitting head to form an independent lubricant tight seal therewith.

6. A lubricant discharge nozzle for servicing a spherical headed fitting comprising, a body member having a lubricant passageway therethrough, one end of said passageway being adapted for connection to a source of lubricant supply, means providing a lubricant tight chamber at the other end of said passageway having an aperture through one wall thereof for partially admitting said spherical fitting head within the chamber, a soft annular sealing member within said chamber presenting an annular spherically concave pocket on one face in registration with said aperture for sealing engagement with that portion of said fitting admitted to said chamber and means including the inner wall of said chamber providing a rigid abutment for the inner face of said sealing member, said abutment being annular in form and providing a continuation of said lubricant conducting passageway, the side walls of said chamber aperture being fashioned to conform to the surface of said fitting head to form an independent lubricant tight seal therewith.

HARRY R. TEAR.